United States Patent
Ozawa et al.

[11] Patent Number: 5,605,611
[45] Date of Patent: Feb. 25, 1997

[54] CARBON DIOXIDE-GENERATING ELECTRODE APPARATUS

[75] Inventors: Sanji Ozawa, Nishiyatsusiro-gun; Chikara Yokose, Nakakoma-gun; Yoichi Ishikawa, Hoya, all of Japan

[73] Assignees: Oriental Sangyo Co., Ltd., Yamanashi; Able Corporation, Tokyo, both of Japan

[21] Appl. No.: 542,436

[22] Filed: Oct. 12, 1995

[30] Foreign Application Priority Data

Oct. 14, 1994 [JP] Japan ................... 6-276111

[51] Int. Cl.⁶ ............... C25B 9/00; C25B 11/12
[52] U.S. Cl. ............ 204/242; 204/272; 204/294; 204/278; 204/284
[58] Field of Search ............ 204/242, 272, 204/294, 278, 284

[56] References Cited

U.S. PATENT DOCUMENTS

| | | | |
|---|---|---|---|
| 2,997,430 | 8/1961 | Föyn | 204/272 X |
| 3,457,152 | 7/1969 | Maloney, Jr. et al. | 204/272 X |
| 4,133,738 | 1/1979 | Will | 204/294 |
| 5,108,563 | 4/1992 | Cook | 204/272 X |

*Primary Examiner*—Donald R. Valentine
*Attorney, Agent, or Firm*—Flynn, Thiel, Boutell & Tanis, P.C.

[57] ABSTRACT

The present invention provides a carbon dioxide-generating electrode apparatus made up of a carbon anode, the upper end part thereof being fixed to a terminal part, and a cathode disposed in a non-contacting relationship so as to face the carbon anode, characterized in that the distance between the carbon anode and the cathode is broadened relatively and continuously from the lower part toward the upper part. The distances between the carbon anode and the cathode are set to be an equal distance at positions on the same horizontal cross section, and the difference ($W_1-W_2$) between a distance ($W_1$) between the side face at the upper end part of the carbon anode and the inner face of the cathode from a distance ($W_2$) between the side face at the lower end part of the carbon anode and the inner face of the cathode is preferably set to a range of 1.0 to 5.0 mm. A carbon dioxide-generating electrode apparatus according to the present invention provides the stable generation of carbon dioxide over a long period of time by an electrolytic operation with a fixed current.

9 Claims, 6 Drawing Sheets

CARBON DIOXIDE-GENERATING ELECTRODE APPARATUS

FIELD OF THE INVENTION

The present invention relates to a carbon dioxide-generating electrode apparatus, which is suitably used in the fields in which carbon dioxide is required to be dissolved in water, such as, for example, the rearing of water grasses and the culturing of algae utilizing photosynthesis in water, or the culturing of animal cells and plant cells by controlling the pH of water by dissolving carbon dioxide therein.

BACKGROUND OF THE INVENTION

In carrying out the rearing of water grasses and the synthetic culturing of algae in a water tank, the carbon dioxide necessary for photosynthesis has to be supplied and dissolved in water. In general, carbon dioxide is supplied to a water tank via a carbon dioxide bomb installed outside the tank, and it is difficult in this method to supply carbon dioxide evenly at a slow flow rate of 10 ml/minute or less. In order to rear ornamental water grasses, a method is employed in which carbon dioxide is filled in a diffusion cylinder with the one end thereof open in the water, and gas-liquid contact at the open end causes carbon dioxide to be dissolved in the water. However, the above method has the defect that the initial feeding supplying and stopping speed can not be controlled.

In order to solve such problems, one of the present inventors developed an apparatus for supplying dissolved carbon dioxide in which water is electrolyzed with carbon used as an anode in a liquid to which dissolved carbon dioxide is supplied as a mechanism for automatically supplying carbon dioxide without relying on the supply of carbon dioxide by an external supply source, such as a bomb, and has already filed a patent application thereon (JP-A-6-154760). In this invention, a specific embodiment comprises a cathode member formed by a perforated pipe made of cylindrical stainless steel, a carbon rod anode inserted in the cathode member in a non-contacting relationship, and a terminal fixed on the cathode member at the upper part thereof. According to the above structure, since not only the carbon anode can be compactly integrated with the cathode but also dissolved carbon dioxide and gaseous hydrogen formed on the cathode is emitted to a liquid from holes formed in the cathode member, it becomes possible to dissolve carbon dioxide into a liquid safely and efficiently.

However, continuing an electrolytic operation at a fixed current using the carbon dioxide-generating electrode apparatus with the structure described above has gradually increased the voltage between both electrodes while a considerable amount of the carbon anode remains and has sometimes resulted in causing a situation such that the current eventually does not flow between the electrodes and electrolysis is stopped.

Investigations repeatedly made by the present inventors in order to solve the cause of this problem have resulted in clarifying that the problem originates in the phenomenon that since in the existing structure described above, a cylindrical carbon anode having the same diameter throughout the length of the rod is inserted in a cylindrical cathode pipe having the same inner diameter in a longitudinal direction in a parallel non-contacting relationship such that the distance between the electrodes becomes fixed, the consumption of the carbon anode particularly in the vicinity of the upper part thereof connected directly to the terminal, proceeds dominantly to locally increase the insulation degree, and the carbon anode at the lower part thereof remains unreacted.

SUMMARY OF THE INVENTION

The present invention has been made in order to solve the problems described above in the current carbon dioxide-generating electrode apparatus.

It is an object of the present invention to provide a carbon dioxide-generating electrode apparatus in which an electrolytic operation with a fixed current secures the always stable generation of carbon dioxide over an extended period of time.

It is an another object of the present invention to provide a carbon dioxide-generating electrode apparatus in which a carbon anode can be uniformly consumed completely without causing trouble, such as the stopping of an electrolytic operation.

The object of the present invention is achieved by a carbon dioxide-generating electrode apparatus comprising a carbon anode, the upper end part thereof being fixed to a terminal part and a cathode placed in a non-contacting relationship so as to face the carbon anode, characterized in that the distance between the carbon anode and the cathode broadens relatively and continuously from the lower part toward the upper part. In the present invention, the arrangement of the carbon anode and the cathode placed in a non-contacting relationship state includes the electrode structure wherein the cathode surrounds the circumference of the carbon anode, the cathodes face both sides of the carbon anode and the carbon anode and the cathode face each other at predetermined intervals.

DETAILED DESCRIPTION OF THE PREFERRED EMBODIMENTS

Figure 1:
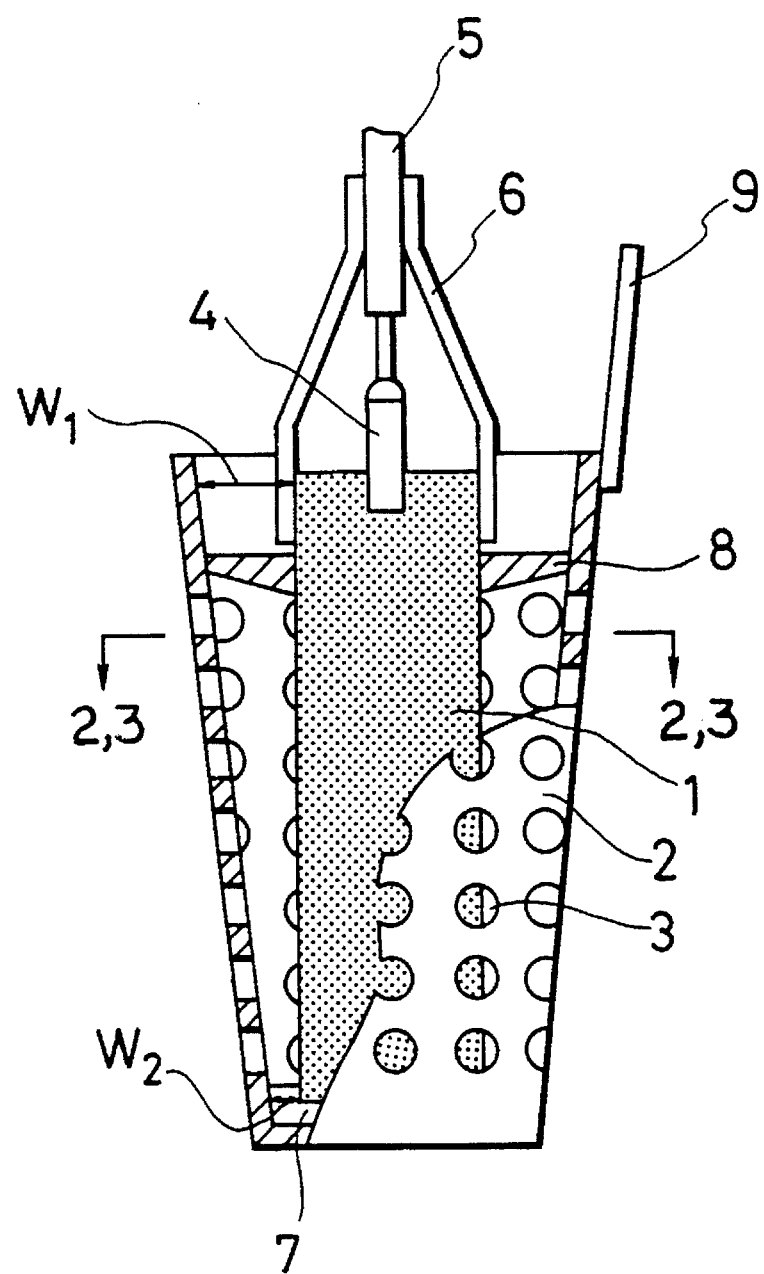
FIG. 1 is a partially notched side cross-sectional drawing illustrating the carbon dioxide-generating apparatus according to the present invention.

FIG. 1 (partially-notched side cross-sectional drawing) illustrates the carbon dioxide-generating electrode apparatus according to the present invention, wherein 1 is a carbon anode, and 2 is a cathode provided so as to surround the circumference of the carbon anode 1 in a non-contacting relationship and having an apertured part on its side face. The upper end part of the anode carbon 1 is connected to a covered lead wire 5 for passing current via a terminal part 4, and a part including the terminal part 4 is covered tightly with a rubber-made waterproof cover 6. A plastic-made insulating spacer 7 is provided between the lower part of the carbon anode 1 and the bottom of the cathode, and the upper positions of the carbon anode 1 and the cathode 2 in which the anode-cathode distance is longer are fixed with a plastic-made fixing member 8. The numeral 9 is a lead wire fixed on the upper part of the cathode member 2.

Figure 2:
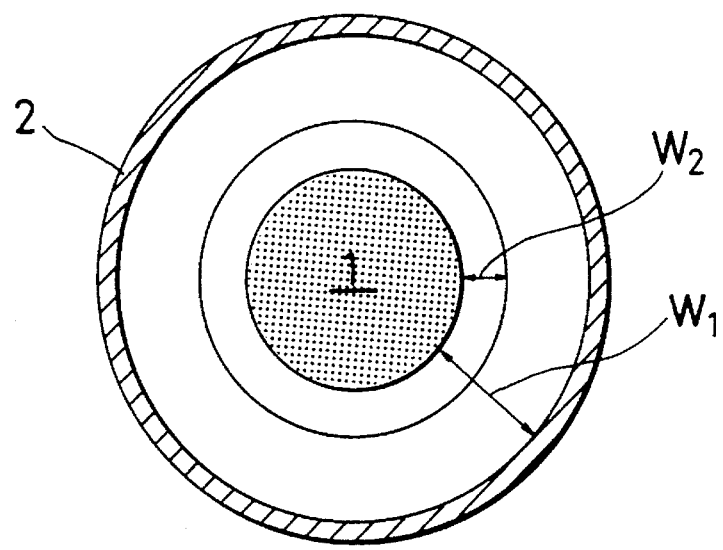
FIG. 2 is A—A line cross-sectional drawing of FIG. 1 when a cylindrical anode carbon is used.
Figure 3:
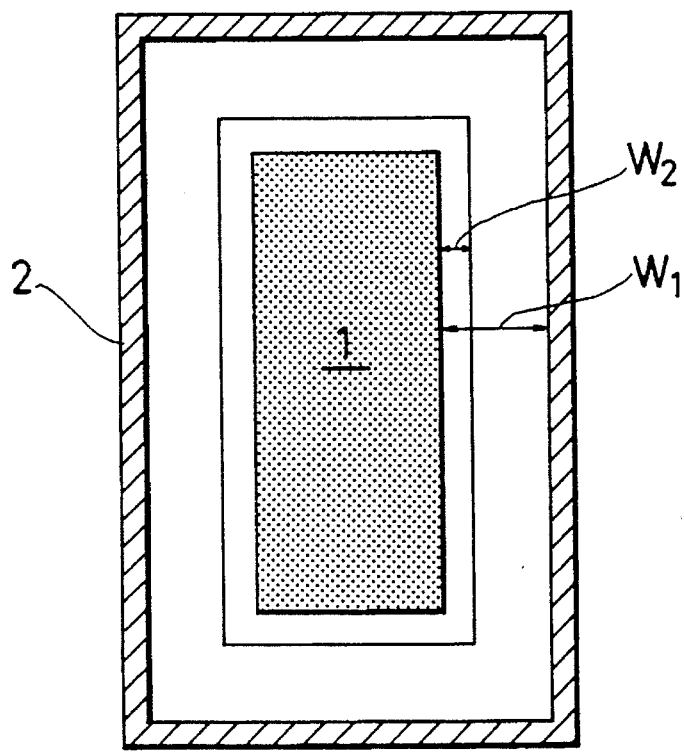
FIG. 3 is A—A line cross-sectional drawing of FIG. 1 when a prismatic anode carbon is used.

The shape of the carbon anode 1 in the apparatus illustrated in FIG. 1 may be cylindrical or square or rectangular. However, when the carbon anode 1 is cylindrical, the cathode 2 is made tubular as illustrated in FIG. 2 (A—A line cross-sectional drawing in FIG. 1). When the carbon anode is prismatic, the cathode is molded to the same square or rectangular tubular shape as illustrated in FIG. 3 (A—A-line cross-sectional drawing in FIG. 1), and the distances between the carbon anode 1 and the cathode 2 in the positions of the same horizontal cross section are provided at an equal distance.

Figure 4:
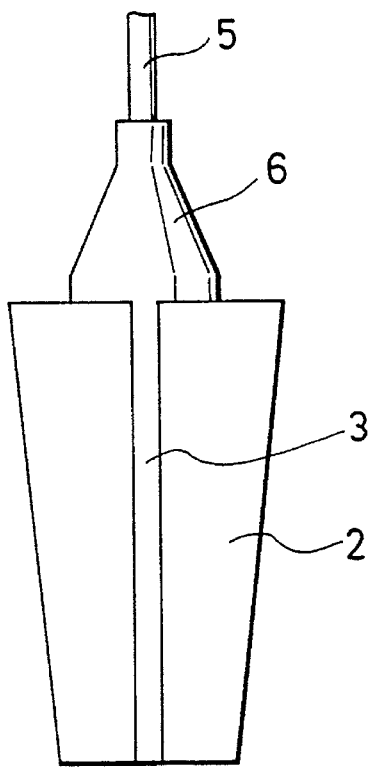
FIG. 4 is an external drawing of the carbon dioxide-generating apparatus according to the present invention in which a cathode having an apertured part divided lengthwise into two pieces is provided.
Figure 5:
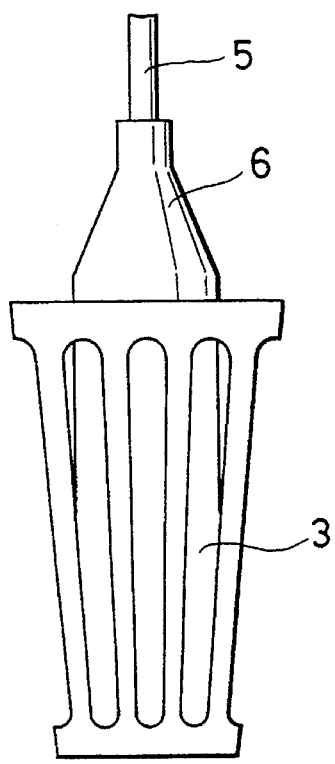
FIG. 5 is an external drawing of the carbon dioxide-generating apparatus according to the present invention in which a cathode having a slit-shaped apertured part is provided.
Figure 6:
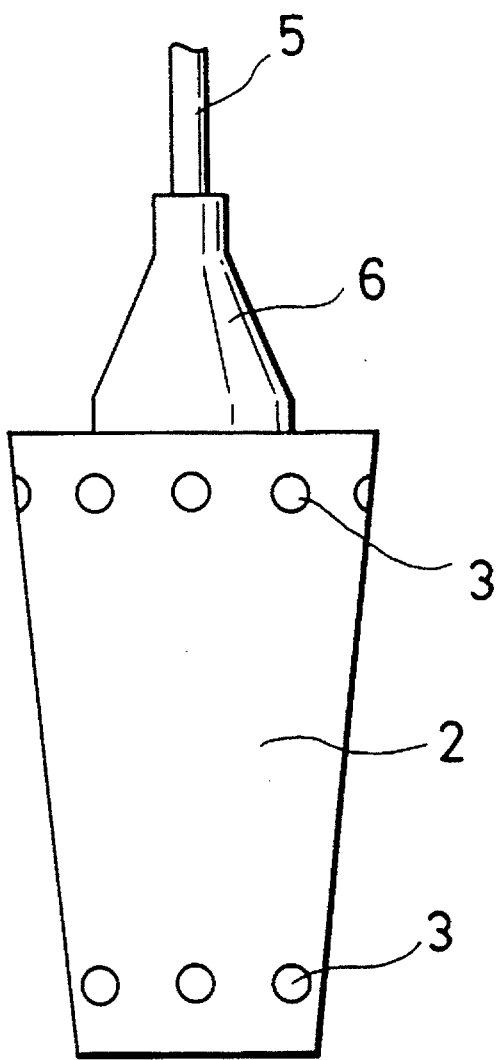
FIG. 6 is an external drawing of the carbon dioxide-generating apparatus according to the present invention in which a cathode having an apertured part formed horizontally in the upper part and the lower part in the form of a row of circular perforations is provided.

The apertured part 3 formed at the side face of the cathode 2, can be formed by dividing lengthwise the cathode 2 into two pieces as shown in FIG. 4, or can be formed as plural circular holes as shown in FIG. 1 or plural slits as shown in FIG. 5, or can be formed in combinations thereof. Accordingly, metal plates in which numerous perforations are formed on the whole face such as wire gauze and punching metal can naturally be used as well. When a cylindrical, square or rectangular shaped rod is used as the anode, the most effective shape of the apertured part 3 is so that a plurality of the perforations as the apertured part 3 are provided in the horizontal positions at the upper part and the lower part of the cylindrical cathode 2 as shown in FIG. 6. According to this shape, since dissolved carbon dioxide resulting on an anode face and hydrogen gas resulting on a cathode face flow out smoothly from upper holes by natural convention, further smooth electrolysis can be carried out.

Figure 7:
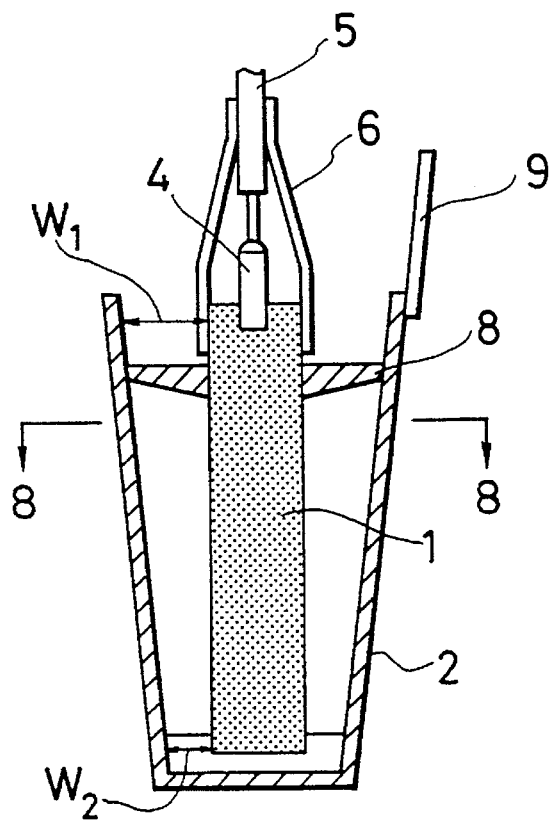
FIG. 7 is a side cross-sectional drawing of the apparatus when a plate-like carbon anode is used.
Figure 8:
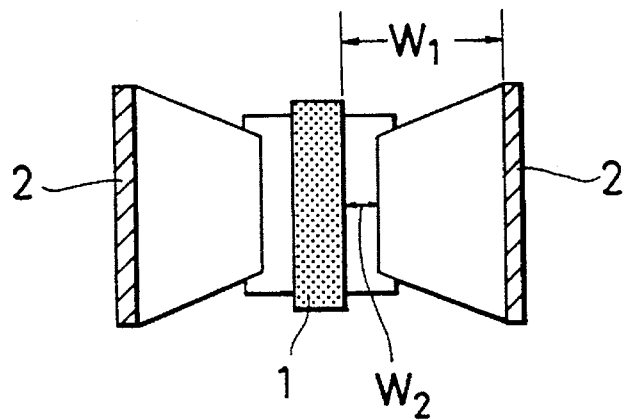
FIG. 8 is A—A line cross-sectional drawing of FIG. 7.

When a plate-like carbon rod anode and a plate shaped cathode are used, as illustrated in FIG. 7 and FIG. 8, a carbon anode 1 is perpendicularly placed, and a cathode 2 is arranged such that the distance between the carbon anode 1 and the cathode 2 is broadens continuously from a lower part toward an upper part, and the side part is in an open state, except for the existence of the cathodes.

Figure 9:
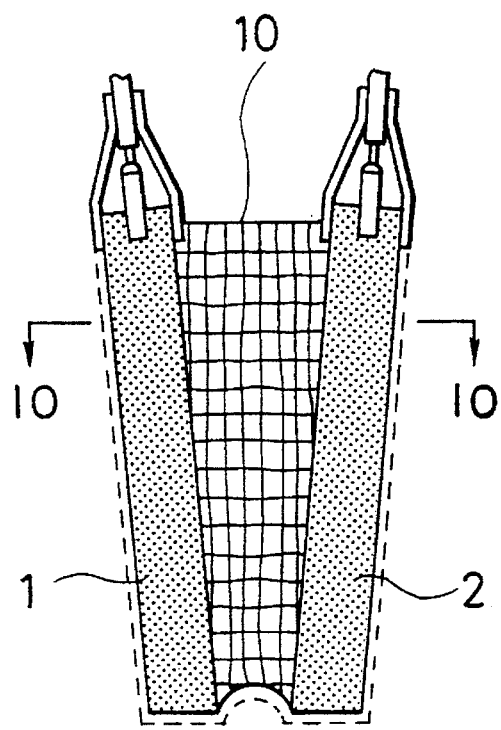
FIG. 9 is a side cross-sectional drawing when an anode and a cathode formed in same the plate-like shape are used.
Figure 10:
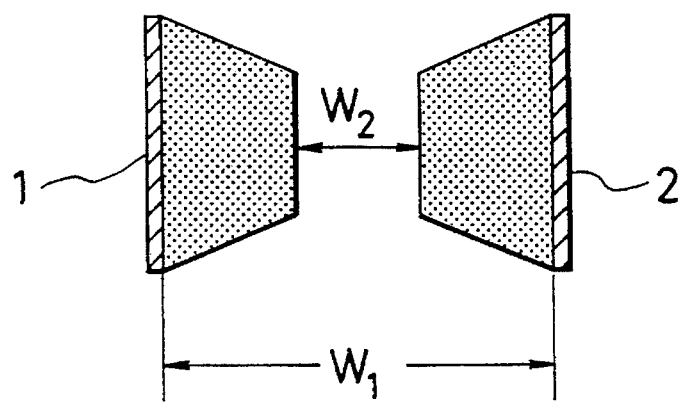
FIG. 10 is A—A line cross-sectional drawing of FIG. 9.

FIG. 9 and FIG. 10 illustrates a carbon dioxide-generating electrode apparatus in which the carbon anode 1 and the cathode 2 are made of the same material and are formed in the same plate-like shape. A carbon anode 1 and a cathode 2 are arranged on the inner face of non-conductive mesh cage such as a plastic cage 10 so as to face each other and in order that the distance ($W_1$) between a side face at the upper end part of the carbon anode 1 and the inner face of the cathode 2 becomes larger than the distance ($W_2$) between a side face at the lower end part of the carbon anode 1 and the inner face of the cathode 2.

An embodiment in which the distance between the carbon anode 1 and the cathode 2 is broadened relatively and continuously from the lower part toward the upper part includes a structure in which as shown in FIG. 2, or FIG. 3, where the carbon anode 1 is a circular cylinder, or square or rectangular rod having the same diameter and inserted in a cylindrical, square or rectangular cathode 2 molded to a reverse conical trapezoidal shape. In addition thereto, there can be employed a structure in which the tapered cylindrical carbon anode 1 in which the upper part has a smaller diameter and the diameter is increased gradually toward the lower part is inserted in the tubular cathode having the same inner diameter. However, in order to continuously generate stable carbon dioxide, it is effective to employ the former structure.

In particular, it is preferable than the distances between the carbon anode 1 and the cathode 2 are set to an equal distance at positions on the same cross section and that an inclined face is provided so that the difference ($W_1-W_2$) between a distance ($W_1$) between the side face at the upper end part of the carbon anode 1 and the inner face of the cathode 2 and a distance ($W_2$) between the side face at the lower end part of the carbon anode 1 and the inner face of the cathode 2 falls in a range of 1.0 to 5.0 mm. Deviating from the distance difference range described above prevents the consumption rate of the anode carbon from proceeding uniformly from the bottom end of the anode carbon, the electrical resistance of the top end of the anode carbon increases and the utilization efficiency of the carbon tends to decrease. The distance ($W_2$) between the side face at the lower end part of the carbon anode 1 and the inner face of the cathode 2 is preferably set to a range of 0.5 to 4.5 mm.

Coke, activated carbon, carbon black, graphite materials using thermosetting resins as carbon sources, vitreous carbon, and other various carbonaceous materials are applied to the carbon anode 1 used in the present invention, but the materials thereof are not specifically restricted. However, preferably used for the object of the present invention is a carbonaceous material which is produced by blending 35 to 70 weight % of activated carbon, 15 to 50 weight % of kaolin series clay, 5 to 10% of graphite, and 3 to 5% of carboxymethylcellulose and kneading it together with water to mold the blend to a prescribed shape, followed by subjecting it to a burning carbonization treatment in a temperature region of 900° to 1200° C. in a non-oxidizing atmosphere. On the other hand, a metallic plate such as copper, steel or nickel plate is applied to the cathode in the apparatus illustrated in FIG. 1 or FIG. 7, and stainless steel plate having an excellent corrosion resistance is preferably used for a metal material constituting the cathode 2. In the apparatus illustrated in FIG. 9, the cathode is preferably formed by carbon plate as well as the anode. The structure described above makes it possible to use the anode and the cathode by changing their polarity at a predetermined interval of time. The structure also makes it possible to use the reverse sides of the anode and/or the cathode by turning them inside out. It results in an effective use of carbon plate forming the anode and the cathode.

The carbon dioxide-generating electrode apparatus of the present invention fundamentally comprises a compact structure in which the circumference of a carbon anode in having its upper end part fixed to a terminal part faces a cathode in a non-contacting relationship to integrate them. It is suspended and set in, for example, a water tank for aquarium fishes in which water grasses and algae grow, and operated by passing a prescribed current between the anode and the cathode. In this case, in a conventional structure in which a cylindrical anode carbon having the same diameter throughout the length of the rod is inserted in a cylindrical cathode pipe having the same inner diameter in a longitudinal direction in such a parallel non-contacting relationship that a distance between the electrodes becomes fixed, the consumption of the anode carbon in the vicinity of the upper part thereof connected directly to the terminal proceeds dominantly to increase an insulation degree, and the electrolysis ceases while the anode at the lower part is hardly consumed, which brings about a reduction in the utilization efficiency of the anode.

In contrast to the above, since the electrode apparatus according to the present invention is designed so that the distance between the carbon anode and the cathode broadens relatively and continuously from the lower part toward the upper part, the anode-cathode distance between the carbon anode and the cathode in the vicinity of the upper part connected directly to the terminal is longer as compared with the distance at the lower part. Since this causes the consumption of the carbon anode at the lower part in which the anode-cathode distance is shorter to proceed most rapidly and allows a continuously inclined consumption degree to be given in which the consumption of the carbon anode decreases gradually from the lower part toward the upper part, the consumption proceeds keeping a very good balance, on the whole, from the bottom end of the anode. This action allows electrolysis to go on stably over an extended time period and causes an always fixed amount of carbon dioxide to be generated continuously.

In particular, in the case where the anode-cathode distances between the carbon anode and the cathode are set to an equal distance at positions on the same cross section, and the difference ($W_1$-$W_2$) between a distance ($W_1$) between the side face at the upper end part of the anode carbon and the inner face of the cathode from a distance ($W_2$) between the side face at the lower end part of the carbon anode and the inner face of the cathode is set to a range of 1.0 to 5.0 mm, the function described above is exhibited more effectively. Further, providing the perforations of the aperture part formed on the surface of the cylindrical cathode in the horizontal positions of the upper part and the lower part prevents hydrogen and carbon dioxide from staying in the cylindrical cathode member by a convectional action and makes it possible to promote the efficient dissolution of carbon dioxide. In the apparatus having the anode and the cathode formed by carbon plate, it becomes possible to perform an uniform consumption of the electrodes, an effective use of the electrodes and simplification of the electrode structure by changing the polarity of the anode and the cathode at a predetermined interval of time and using the reverse sides of the anode and/or the cathode.

EXAMPLE

The examples of the present invention will be explained below in detail based on illustrated examples. However, the present invention is not restricted to these examples.

Example 1

As shown in FIG. 1, a carbon dioxide-generating electrode apparatus was produced having a structure in which a cylindrical carbon anode 1 having a uniform diameter is inserted in the center of a reverse conical trapezoidal cathode 2 made of a stainless steel plate and having an apertured part 3 where a lot of perforations were bored on the side face thereof in a non-contacting relationship. The upper end part of the carbon anode 1 was connected to a covered lead wire 5 for passing current via a terminal part 4, and a part including the terminal part 4 was tightly covered with a rubber-made waterproof cover 6. A plastic-made insulating spacer 7 was provided between the lower part of the carbon anode 1 and the cathode 2. The anode-cathode distances between the carbon anode 1 and the cathode 2 were set to an equal distance on the same cross section, and the design was made so that the difference ($W_1$-$W_2$) between a distance ($W_1$) between the side face at the upper end part of the carbon anode 1 and the inner face of the cathode 2 from a distance ($W_2$) between the side face at the lower end part of the carbon anode 1 and the inner face of the cathode 2 became 2.0 mm, and the upper positions of the carbon anode 1 and the cathode 2 in which the anode-cathode distance was longer were fixed with a plastic-made fixing member 8.

The carbon anode 1 was produced in the following manner. Blended were 60 weight % of coconut husk activated carbon ("Diasorp" manufactured by Mitsubishi Chemical Co., Ltd.) having a particle diameter of 53 to 140 μm, a specific surface area of 1570 $m^2$/g, and an iron content of 0.1 weight % or less, 25 weight % of kaolin clay (manufactured by Kyoritsu Yogyo Genryo Co., Ltd.), 10 weight % of graphite powder, and 5 weight % of carboxymethyl cellulose, and water of 80 weight parts based on 100 weight parts of the above blend was added and kneaded sufficiently. The kneaded product was extrusion-molded in a cylindrical form with a plunger type extrusion-molding machine and dried at a temperature of 50° C. to cure a binder component. Then, the molding was transferred to a kiln maintained in an argon gas atmosphere, and the temperature was raised up to 1000° C. at a temperature-raising speed of 100° C./hour. The molding was heated at this temperature for 10 hours to subject it to a carbonization treatment. This carbon rod was surface-treated, whereby a carbon anode 1 having a diameter of 15 mm and a length of 100 mm was obtained.

Each carbon dioxide-generating electrode apparatus described above was set in a water grass water tank filled with fresh water by suspension so that it was dipped therein, and a lead wire at the cathode was connected to a constant-current generator to carry out an electrolytic operation with the conditions of a current of 120 mA and an anode current density of 2.8 mA/$cm^2$, until the voltage between the both electrodes increased to 10 V. After starting the electrolysis, measurement was made with a commercially available dissolved carbon dioxide reagent for fresh water (manufactured by Tetra Co., Ltd.) to confirm that carbon dioxide was stably generated. In this case, after electrolysis for 38 days, the current flow amount was 398×$10^3$ coulomb and stabilized without having a variation with the passage of time.

Example 2

The carbon rod prepared from the same material as that used in Example 1 was processed to prepare a cylindrical carbon anode having a diameter of 15 mm and a length of 100 mm and a carbon anode having a rectangular cross section (thickness 5 mm and width 15 mm) and a length of 150 mm. These carbon anodes were used to fabricate carbon dioxide-generating electrode apparatuses having the same structure as that employed in Example 1. When the rectangular shaped carbon anode was used, a cathode was formed as well in a rectangular tubular shape. The distances between the carbon anode 1 and the cathode 2 were set to be an equal distance on the same cross section, and the difference ($W_1$-$W_2$) between a distance ($W_1$) between the side face at the upper end part of the carbon anode 1 and the inner face of the cathode from a distance ($W_2$) between the side face at the lower end part of the carbon anode 1 and the inner face of the cathode 2 varied in a range of 0.5 to 7.0 mm to carry out an electrolytic operation under the same conditions as those employed in Example 1. In this case, the current flow amount was measured, and the result thereof is shown in Table 1 contrasted with the difference ($W_1-W_2$).

It was confirmed from the results summarized in Table 1 that when the differences ($W_1-W_2$) were 0.5 mm and 7.0 mm, the current flow amount was reduced but in the ranges of 1.0 to 5.0 mm, the current flow amount stabilized at a high level and that the electrolytic operation proceeded effectively and the carbon anode was uniformly consumed.

TABLE 1

| Difference (W1–W2) | Current flow amount (x $10^3$ coulomb) carbon anode rod | | |
|---|---|---|---|
| | Cylinder length 100 mm | Cylinder length 150 mm | Plate length 150 mm |
| 0.5 | 261 | 391 | 402 |
| 1.0 | 336 | 514 | 524 |
| 1.5 | 350 | 547 | 562 |
| 2.0 | 398 | 590 | 587 |
| 3.0 | 392 | 586 | 583 |
| 4.0 | 384 | 572 | 576 |
| 5.0 | 367 | 558 | 561 |
| 7.0 | 280 | 423 | 425 |

Example 3

In Example 1, the apertured part 3 of the cathode 2 was formed in the horizontal positions of the upper part and the lower part in the form of a row of circular perforations. A carbon dioxide-generating electrode apparatus was fabricated in the same manner as that in Example 1, except that this cathode member was used. Then, an electrolytic operation was carried out, and it was visually observed that the generation efficiency of carbon dioxide was enhanced and the life of the carbon anode increases as compared with the case where a lot of perforations were formed on the whole side face of the cathode.

Example 4

The carbon rod prepared from the same material as that used in Example 1 was processed to prepare a carbon anode and a cathode of a carbon plate having a rectangular cross section (thickness 5 mm and width 15 mm) and a length of 150 mm. The carbon anode 1 and the cathode 2 were arranged, as shown in FIG. 9, on opposite sides of a non-conductive mesh cage 10 comprising a synthetic resinous material. The difference ($W_1-W_2$) between the distance ($W_1$) between the top end of both carbon plates and the distance ($W_2$) between the bottom end of both carbon plates was set to 2.0 mm. In the above apparatus, an electrolytic operation was carried out using an electric current of 100 mA with the polarity of the anode and cathode changing at an interval of 30 minutes. After starting the electrolytic operation, measurement was made with a commercially available dissolved carbon-dioxide reagent for fresh water (manufactured by Tetra Co., Ltd.), and it was confirmed that carbon dioxide was stably generated.

At the time, when the voltage between both electrodes exceeded 10 V, the both carbon plate forming the anode and the cathode were turned over in order that the back sides of the anode and the cathode face each other. Electrolytic operation was performed thereafter and voltage between the both electrodes decreased down to 5 V. The surface conditions of the both electrodes were observed after voltage between the both electrodes increased over 10 V. As its result, a uniform consumption on the whole surfaces of the both carbon plate was observed.

As described above, the carbon dioxide-generating electrode apparatus according to the present invention allows electrolysis to stably be conducted over an extended period of time and makes it possible to continuously generate a fixed amount of carbon dioxide. Accordingly, a carbon anode can be uniformly consumed to the last without causing troubles such as the stopping of an electrolytic operation and the use efficiency thereof can be notably improved.

What is claimed is:

1. A carbon dioxide-generating electrode apparatus comprising a carbon anode and a cathode disposed in a non-contacting face-to-face relationship, said carbon anode having a terminal provided at an upper portion thereof which is connected to a source of electric current and the distance between the carbon anode and the cathode gradually increasing from a lower portion of said carbon anode through said carbon anode upper portion.

2. A carbon dioxide-generating electrode apparatus as claimed in claim 1, wherein the carbon anode is a cylindrically shaped rod and the cathode is in a tubular shape and arranged so as to surround the circumference of the carbon anode.

3. A carbon dioxide-generating electrode apparatus as claimed in claim 1, wherein the carbon anode is a square or rectangular shaped rod and the cathode is in a square or rectangular tubular shape and arranged so as to surround circumference of the carbon anode.

4. A carbon dioxide-generating electrode apparatus as claimed in claim 1, wherein the carbon anode is a plate-shaped rod and the cathode is formed in a plate shape, the cathode being arranged so as to face one side or both sides of the carbon anode.

5. A carbon dioxide-generating electrode apparatus as claimed in claim 1, wherein the carbon anode and the cathode are made of the same material and are formed in a plate shape.

6. A carbon dioxide-generating electrode apparatus as claimed in claim 1, wherein the distances between the carbon anode and the cathode are an equal distance at positions along the same horizontal cross section, and the difference, $W_1-W_2$, between a distance between a side face of the carbon anode, at the upper portion of the carbon anode, and the inner face of the cathode, $W_1$, and a distance between a side face of the carbon anode, at the lower portion of the carbon anode, and the inner face of the cathode, $W_2$, is set to a range of 1.0 to 5.0 mm.

7. A carbon dioxide-generating electrode apparatus as claimed in claim 1, wherein the cathode is formed by plate-shaped electrically conductive metal having an aperture provided therein.

8. A carbon dioxide-generating electrode apparatus as claimed in claim 7, wherein the aperture is formed by dividing the cathode plate lengthwise into two pieces and/or boring a plurality of perforations in the cathode plate.

9. A carbon dioxide-generating electrode apparatus comprising a carbon anode and an apertured cathode surrounding said carbon anode in a non-contacting face-to-face relationship, said carbon anode having a terminal provided at an upper portion thereof which is connected to a source of electric current and is at equal distances from the cathode at positions along a horizontal cross-section through the carbon anode and the cathode, the horizontal cross-section being at any position along the length of the carbon anode, and the difference, $W_1-W_2$, between a distance between a side face of the carbon anode, at the upper portion of the carbon anode, and the inner face of the cathode along the horizontal cross-section, $W_1$, and a distance between the side face of the carbon anode, at a lower portion of the carbon anode, and the inner face of the cathode along the horizontal cross-section, $W_2$, is from 1.0 to 5.0 mm.

* * * * *